United States Patent
Okuda et al.

(10) Patent No.: US 8,858,059 B2
(45) Date of Patent: Oct. 14, 2014

(54) SURFACE ILLUMINATION DEVICE

(75) Inventors: Mitsuru Okuda, Shiga (JP); Masayuki Shinohara, Kyoto (JP); Kazuhide Hirota, Shiga (JP); Kazuyuki Okada, Shiga (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 14/000,611

(22) PCT Filed: Mar. 7, 2012

(86) PCT No.: PCT/JP2012/055837
§ 371 (c)(1),
(2), (4) Date: Sep. 12, 2013

(87) PCT Pub. No.: WO2012/124569
PCT Pub. Date: Sep. 20, 2012

(65) Prior Publication Data
US 2013/0343084 A1   Dec. 26, 2013

(30) Foreign Application Priority Data

Mar. 15, 2011 (JP) ................................ 2011-057299

(51) Int. Cl.
*F21V 8/00* (2006.01)
*C22C 38/06* (2006.01)
(Continued)

(52) U.S. Cl.
CPC ............... *C22C 38/58* (2013.01); *C22C 38/06* (2013.01); *C22C 38/42* (2013.01); *C22C 38/48* (2013.01); *G09F 13/18* (2013.01); *C22C 38/46* (2013.01); *C22C 38/52* (2013.01); *C22C 38/008* (2013.01); *G02B 6/0011* (2013.01); *G02B 6/0036* (2013.01); *C22C 38/001* (2013.01); *C22C 38/02* (2013.01); *H04M 1/22* (2013.01); *C22C 38/44* (2013.01); *G02B 6/006* (2013.01); *C22C 38/54* (2013.01); *C22C 38/04* (2013.01); *C22C 38/50* (2013.01)
USPC ...................... 362/626; 362/249.02; 362/235

(58) Field of Classification Search
USPC ...................... 362/626, 249.02, 249.01, 235
See application file for complete search history.

(56) References Cited

U.S. PATENT DOCUMENTS 6,124,906 A * 9/2000 Kawada et al. ................. 349/65
7,507,011 B2 * 3/2009 Ueno et al. ..................... 362/625

(Continued)

FOREIGN PATENT DOCUMENTS

JP    2001-243822 A    9/2001

OTHER PUBLICATIONS

International Search Report for corresponding International Application No. PCT/JP2012/055837, mailed Jun. 5, 2012 (4 pages).

*Primary Examiner* — Tracie Y Green
(74) *Attorney, Agent, or Firm* — Osha Liang LLP

(57) ABSTRACT

A surface illumination device has a light source and a light guide plate having a light-emitting surface. The light guide plate guides light from the light source such that the light is emitted from a display region of the light-emitting surface. A plurality of first deflection patterns having deflection inclined surfaces and a plurality of second deflection patterns having deflection inclined surfaces are formed in the display region in at least one of the light-emitting surface of the light guide plate and an opposite surface to the light-emitting surface. When viewed from a direction perpendicular to the light-emitting surface of the light guide plate, the first deflection pattern is disposed such that an angle formed by a line normal to the deflection inclined surface and a direction connecting the light source and the first deflection pattern is less than or equal to 30°.

6 Claims, 17 Drawing Sheets

(51) Int. Cl.
*C22C 38/42* (2006.01)
*C22C 38/48* (2006.01)
*G09F 13/18* (2006.01)
*C22C 38/46* (2006.01)
*C22C 38/52* (2006.01)
*C22C 38/00* (2006.01)
*C22C 38/58* (2006.01)
*C22C 38/02* (2006.01)
*C22C 38/44* (2006.01)
*C22C 38/54* (2006.01)
*C22C 38/04* (2006.01)
*C22C 38/50* (2006.01)
*H04M 1/22* (2006.01)

(56) References Cited

U.S. PATENT DOCUMENTS 8,297,825 B2 * 10/2012 Onishi .................. 362/607
2006/0164864 A1 * 7/2006 Arihara ................ 362/621

* cited by examiner

SURFACE ILLUMINATION DEVICE

BACKGROUND

1. Technical Field

The present invention relates to a surface illumination device. Specifically, the present invention relates to a surface illumination device, which is used in display while incorporated in mobile devices such as a smartphone and a tablet computer.

2. Related Art

In the smartphone, the tablet computer, an electronic book reader, and the like, an icon is lighted in a position of a switch, and the position and a type of the switch is expressed by the icon. For example, in a smartphone 11 in FIG. 1(A), an icon 13 is displayed below a liquid crystal display screen 12. When the icon 13 is pressed by a finger, a switch 14 provided beneath the icon 13 is turned on to switch a function of the smartphone 11.

FIG. 1(B) illustrates a surface illumination device 15 for the display, which is incorporated in a lower portion of the smartphone 11 in FIG. 1(A). FIG. 2(A) illustrates a schematic section of the surface illumination device 15. The surface illumination device 15 includes a light guide plate 16 and a light source 17. The light guide plate 16 is molded using a transparent material, such as a polycarbonate (PC) resin and a polymethylmethacrylate (PMMA) resin, which has a high refractive index. The light source 17 is a minute light source (a point light source) in which an LED is used, and the light source 17 is disposed while a light-exit window is opposed to one (light incident end face 16a) of end faces of the light guide plate 16. Many minute prism deflection patterns 18 are formed in a lower surface (sometimes an upper surface) of the light guide plate 16, and an icon-shaped display unit 19 is constructed by a set of deflection patterns 18 as illustrated in FIG. 2(B). The deflection patterns 18 are arrayed in an arc shape about a point near the light source 17 and extend in directions along the arc about the point. A thin, flexible light guide sheet is used as the light guide plate 16 in the case that the switch 14 is disposed beneath the display unit 19. Although the icon 13 and the display unit 19 are expressed by a character "A" in FIGS. 1(A) and 1(B), actually design marks such as a magnifying glass and a handset are frequently used as illustrated in FIG. 3. For the sake of convenience, the icon 13 and the display unit 19 are expressed by the character "A" except FIG. 3.

When the light source 17 emits light in the surface illumination device 15, the light incident to the light guide plate 16 from the light incident end face 16a is guided in the light guide plate 16 while totally reflected by the upper surface, the lower surface, and both side surfaces of the light guide plate 16. When the light guided in the light guide plate 16 reaches the display unit 19 as illustrated in FIG. 2(A), the light is totally reflected by a deflection reflecting surface 18a of the deflection pattern 18. In the light totally reflected upward by the deflection reflecting surface 18a, the light incident to the upper surface (a light-emitting surface 16c) of the light guide plate 16 at an angle smaller than a total reflection critical angle is transmitted through the light incident end face 16a to emit upward (the light is transmitted while refracted by the deflection pattern 18 in the case that the deflection pattern 18 is provided in the light-emitting surface 16c). As a result, the light emits into the icon shape to light the icon 13 of the smartphone 11.

However, in the smartphone 11 in which the surface illumination device 15 is used, when a user vertically inclines the smartphone 11 while holding the smartphone 11 in the hand, unfortunately luminance of the icon 13 changes rapidly, or the icon 13 is seen while flickering. The reason the phenomenon is generated will be described with reference to FIGS. 4 and 5. FIGS. 4(B) and 5(B) illustrate directional patterns of the light emitting from the light-emitting surface 16c of the light guide plate 16 when the directional pattern is viewed from a direction (a Z-direction) perpendicular to the light-emitting surface 16c, an X-direction indicates a length direction (a crosswise direction of the smartphone 11) of the light guide plate 16, and a Y-direction indicates a width direction (a longitudinal direction of the smartphone 11) of the light guide plate 16.

In the case that the light emitted from the small light source 17 is totally reflected by the deflection pattern 18 to emit from the light-emitting surface 16c, because the light headed from the light source 17 to certain deflection pattern 18 is the light having a narrow range when viewed from the direction perpendicular to the light-emitting surface 16c, the light emitting from the light-emitting surface 16c also has the narrow directivity. That is, light La that goes straight to reach the display unit 19 or the deflection pattern 18 as illustrated in FIG. 4(A) has a directional pattern Ca that is lengthened in the X-direction as illustrated in FIG. 4(B). Therefore, although the light having the directional pattern Ca can be recognized with high luminance from the front direction of the smartphone 11, the light rapidly becomes dark to hardly recognize the icon 13 when the smartphone 11 is vertically inclined.

In the light incident to the display unit 19, part of the light is incident to the deflection pattern 18 after totally reflected by a side surface 16b of the light guide plate 16 like light Lb in FIG. 5(A). As indicated by a broken line in FIG. 2(A), the light Lb is obliquely incident to the deflection pattern 18 and totally reflected toward the oblique direction by the deflection pattern 18. Therefore, the light Lb emitting from the light-emitting surface 16c has a narrow directional pattern Cb that is inclined as illustrated in FIG. 5(B).

In the case that the light totally reflected by the side surface 16b of the light guide plate 16 has a high intensity, because the light Cb having the directional pattern Cb is added to the light La having the directional pattern Ca as described above, the icon 13 repeatedly becomes bright and dark to flicker, and the icon 13 is hardly seen, when the user vertically inclines the smartphone 11 while holding the smartphone 11 in the hand.

In a surface illumination device 21 in FIGS. 6(A) and 6(B), in the case that the display unit 19 is constructed by a set of dome-shaped pattern 22 instead of the prism deflection pattern 18, because the light incident to the display unit 19 from the light source side as illustrated in FIG. 7(A) is scattered by the dome-shaped pattern 22, the directivity of the light emitting from the light-emitting surface 16c, particularly the directivity in the Y-direction spreads to obtain a directional pattern Cc as illustrated in FIG. 7(B). Accordingly, even if the user vertically (the Y-direction) inclines the smartphone 11, the icon 13 hardly rapidly becomes dark or flickers. However, in the case that the display unit 19 is constructed by the dome-shaped pattern 22, because the light La from the light source side scatters, the luminance of the icon 13 is extremely degraded when viewed from the front.

Patent Document 1: Japanese Unexamined Patent Publication No. 2001-243822

SUMMARY

One or more embodiments of the present invention provides a surface illumination device that can spread a directivity angle of the display without degrading the luminance of the display such as the icon.

In accordance with one or more embodiments of the present invention, a surface illumination device includes: a light source; a light guide plate that causes light guided from the light source to emit from a display region of a light-emitting surface, wherein a plurality of first deflection patterns having deflection inclined surfaces and a plurality of second deflection patterns having deflection inclined surfaces are formed in the display region in at least one of the light-emitting surface of the light guide plate and an opposite surface to the light-emitting surface, when viewed from a direction perpendicular to the light-emitting surface of the light guide plate, the first deflection pattern is disposed such that an angle formed by a line normal to the deflection inclined surface and a direction connecting the light source and the first deflection pattern is less than or equal to 30°, when viewed from a direction perpendicular to the light-emitting surface of the light guide plate, the second deflection pattern is disposed such that an angle formed by a line normal to the deflection inclined surface and a direction connecting the light source and the second deflection pattern is less than or equal to 25°, and when viewed from a direction perpendicular to the light-emitting surface of the light guide plate, part of the light emitted from the light source is reflected on a side surface side of the light guide plate to reach the second deflection pattern.

In the surface illumination device according to one or more embodiments of the present invention, the first deflection pattern is disposed at a substantially right angle with respect to the direction of the light going straight from the light source, and the second deflection pattern is disposed in substantially parallel to the direction of the light going straight from the light source. The light reaches the display unit from not only the light source side but also the side surface side. When viewed from the direction perpendicular to the light-emitting surface, the light that is reflected by or transmitted through the first deflection pattern to emit from the light-emitting surface differs from the light that is reflected by or transmitted through the second deflection pattern to emit from the light-emitting surface in the directional pattern by about 90°. Therefore, the directional pattern spreads in two directions as a whole. Even if the user inclines the device in which the surface illumination device is incorporated, or even if the user changes the direction in which the user sees the device, the display hardly rapidly becomes dark or flickers. Additionally, the light is guided onto the side surface side of the light guide plate, and the light that is not originally incident to the display unit is guided to the display unit and used to improve the directivity. Therefore, there is no risk of degrading the front luminance unlike the case that the dome-shaped pattern is used. Therefore, in one or more embodiments of the present invention, quality of the display of the icon and the like can be improved by enhancing use efficiency of the light.

In the surface illumination device according to one or more embodiments of the present invention, part of the light emitted from the light source is totally reflected by a side surface side of the light guide plate to reach the second deflection pattern. It is not necessary to particularly perform working to the light guide plate. Accordingly, cost can be reduced.

In the surface illumination device according to one or more embodiments of the present invention, an inclined surface is provided in the side surface of the light guide plate in order to totally reflect part of the light emitted from the light source toward the second deflection pattern. Accordingly, the directional pattern of the light emitting from the light-emitting surface can be controlled by adjusting a position and an angle of the inclined surface.

In the surface illumination device according to one or more embodiments of the present invention, a reflection pattern is provided near the side surface of the light guide plate in order to totally reflect part of the light emitted from the light source toward the second deflection pattern. Accordingly, the directional pattern of the light emitting from the light-emitting surface can be controlled by adjusting the position and the angle of the reflection pattern.

In accordance with one or more embodiments of the present invention, a mobile phone that has transmission and reception functions, includes the surface illumination device according to one or more embodiments of the present invention in order to optically display certain shape. In one or more embodiments of the present invention, the surface illumination device according to one or more embodiments of the present invention is used in mobile phones such as the smartphone. Accordingly, in the mobile phone according to one or more embodiments of the present invention, the display of the lighted icon and the like can be prevented from rapidly becoming dark except the front, and the display can be prevented from flickering, thereby improving display quality.

In accordance with one or more embodiments of the present invention, an information terminal that has an information processing function includes the surface illumination device according to one or more embodiments of the present invention in order to optically display certain shape. In one or more embodiments of the present invention, the surface illumination device of one or more embodiments of the present invention is used in information terminals such as a mobile computer, the tablet computer, an electronic diary, and an electronic dictionary. Accordingly, in the mobile phone of one or more embodiments of the present invention, the display of the lighted icon and the like can be prevented from rapidly becoming dark except the front, and the display can be prevented from flickering, thereby improving display quality.

In one or more embodiments of the present invention, the components are properly combined, and many variations can be made by the combination of the components.

DETAILED DESCRIPTION

Hereinafter, embodiments of the present invention will be described in detail with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Furthermore, the present invention is not limited to the following embodiments, but various design changes can be made without departing from the scope of the present invention.

Figure 1A:
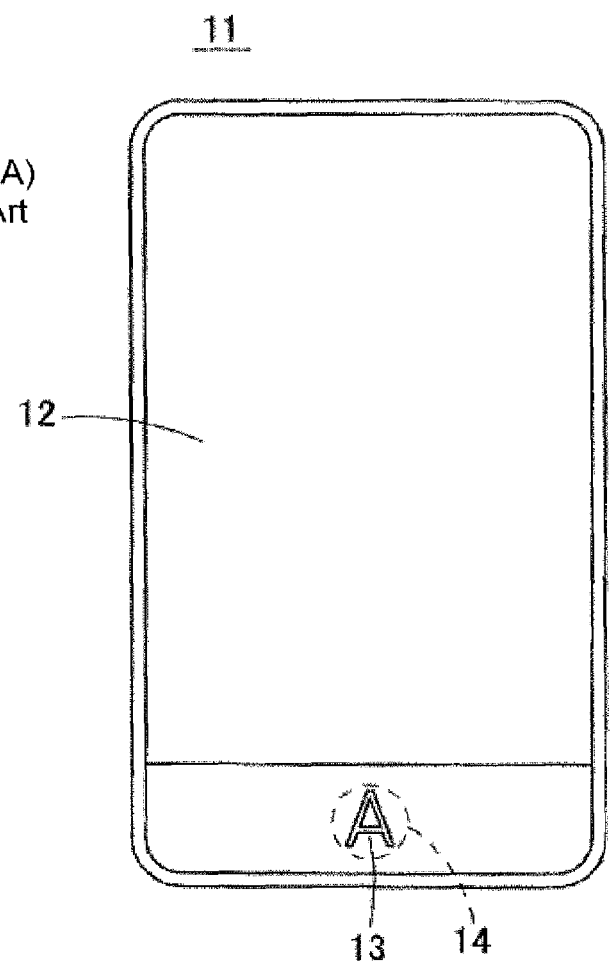
FIG. 1(A) is a plan view of a smartphone.
Figure 1B:
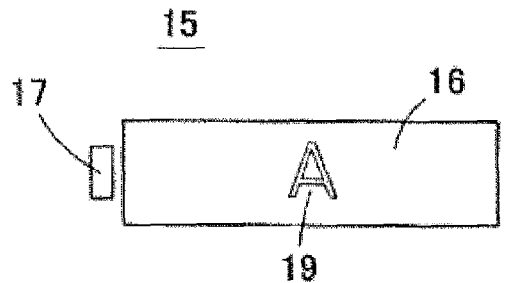
FIG. 1(B) is a plan view of a surface illumination device incorporated in the smartphone in FIG. 1(A).
Figure 2A:
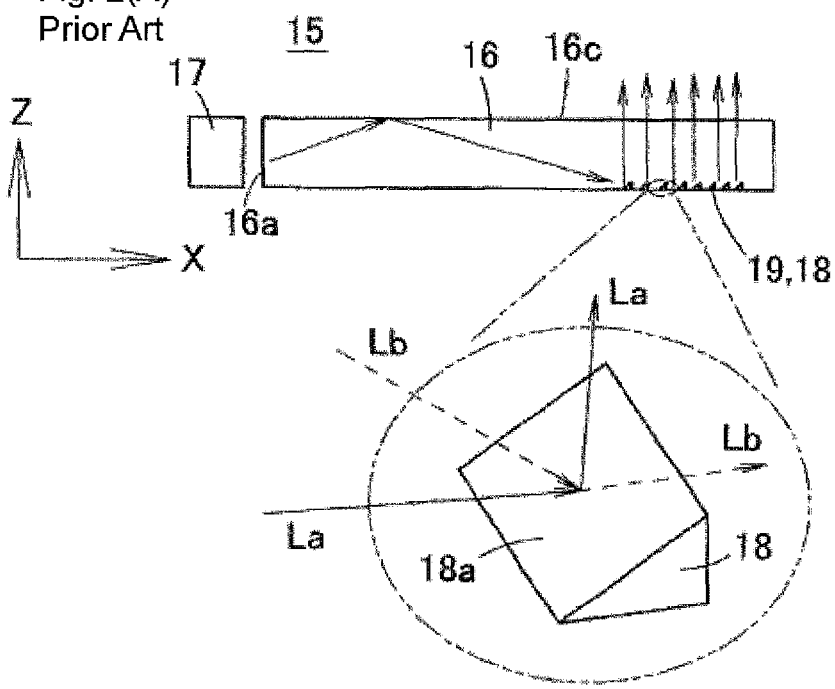
FIG. 2(A) is a schematic sectional view of a conventional surface illumination device together with one enlarged deflection pattern.
Figure 2B:
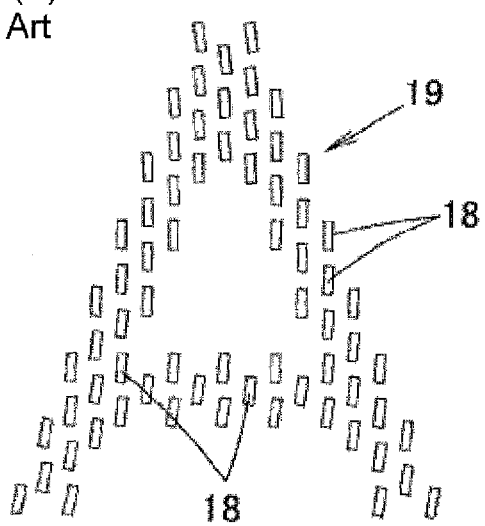
FIG. 2(B) is a plan view of a display unit (deflection pattern region) provided in a conventional light guide plate.
Figure 3:
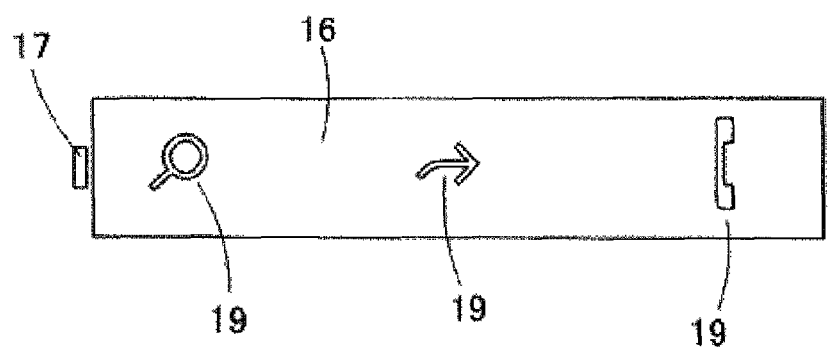
FIG. 3 is a view illustrating a specific design of the display unit.
Figure 4A:
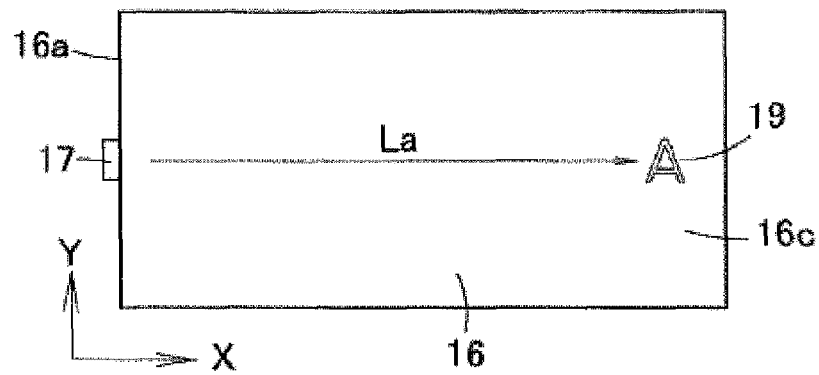
FIG. 4(A) is a plan view illustrating light going straight from a light source side toward the display unit in the conventional surface illumination device.
Figure 4B:
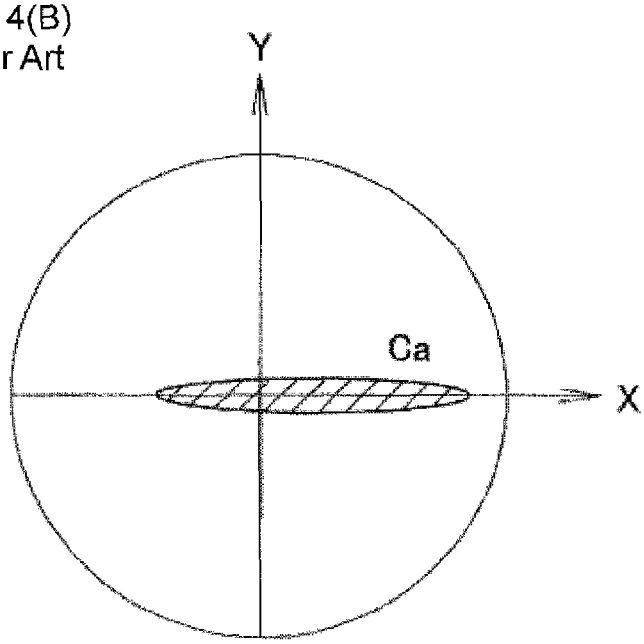
FIG. 4(B) is a view illustrating a directional pattern when the light going straight from the light source emits from a light-emitting surface in the conventional surface illumination device.

The surface illumination device according to one or more embodiments of the present invention is used in display of mobile devices such as a mobile phone, a tablet computer, and an electronic book reader. The case that the surface illumination device is used in a smartphone that is of the mobile phone will be described below. Because the smartphone is illustrated in FIG. 1(A), the smartphone is not further displayed. In the surface illumination device according to one or more embodiments of the present invention, because the conventional surface illumination device 15 is illustrated in FIGS. 1(B), 2(A), and 2(B), the component identical to that of the conventional surface illumination device 15 is designated by the identical numeral, the overlapping description is omitted, and a point different from that of the conventional surface illumination device 15 is mainly be described.

(First Embodiment)

Figure 8A:
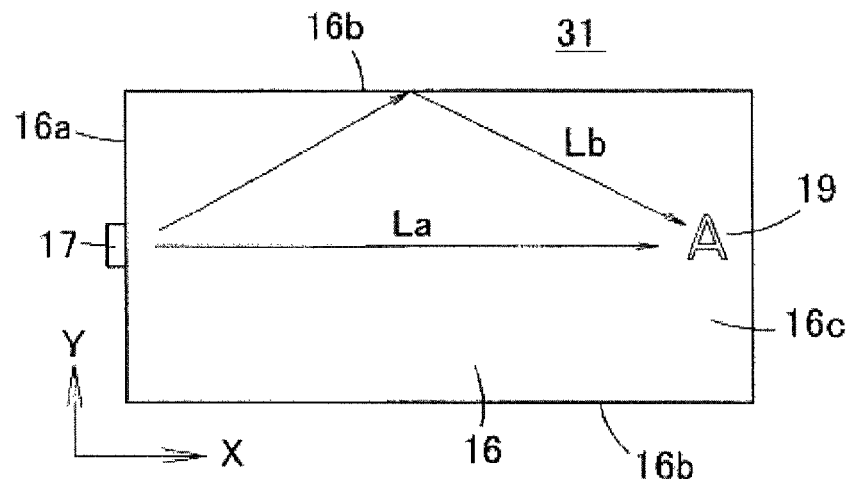
FIG. 8(A) is a schematic plan view of a surface illumination device according to a first embodiment of the present invention.
Figure 11A:
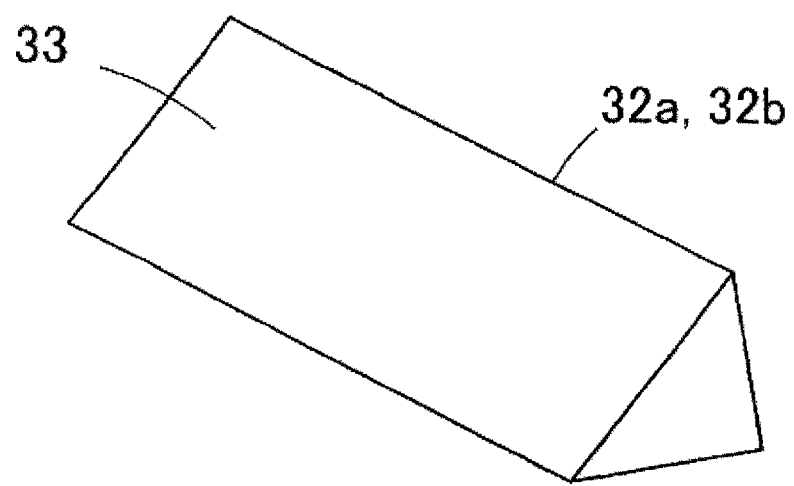
FIGS. 11(A) and 11(B) are enlarged perspective views of the deflection pattern.
Figure 11B:
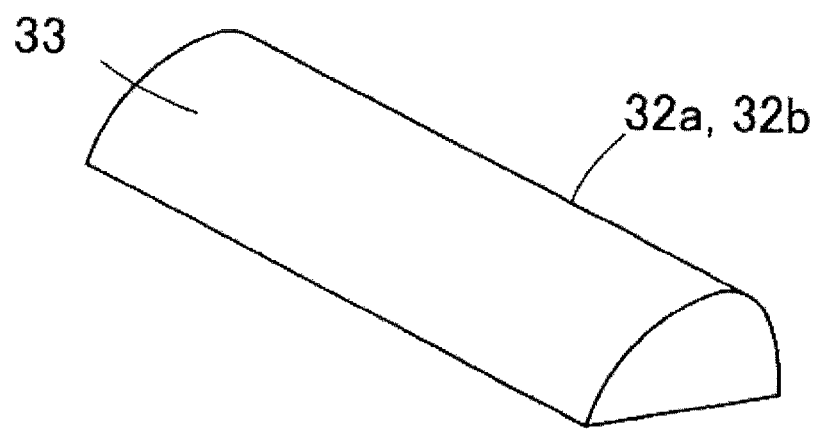

A surface illumination device 31 according to a first embodiment of the present invention will be described. FIG. 8(A) is a schematic plan view of the surface illumination device 31 of the first embodiment. In the surface illumination device 31, the display unit 19 is provided in at least one of the upper surface (light-emitting surface 16c) and the lower surface of the light guide plate 16. The display unit 19 includes two types of deflection patterns 32a and 32b. Each of the deflection patterns 32a and 32b includes a deflection reflecting surface 33. The deflection reflecting surface 33 is an optical pattern that is recessed in the lower surface of the light guide plate 16, and the deflection reflecting surface 33 totally reflects the light. For example, the deflection patterns 32a and 32b are formed into a triangular prism, particularly a right triangular shape as illustrated in FIG. 11(A). Alternatively, the deflection patterns 32a and 32b may be formed into a curved shape in which the deflection reflecting surface 33 is curved as illustrated in FIG. 11(B).

Figure 8B:
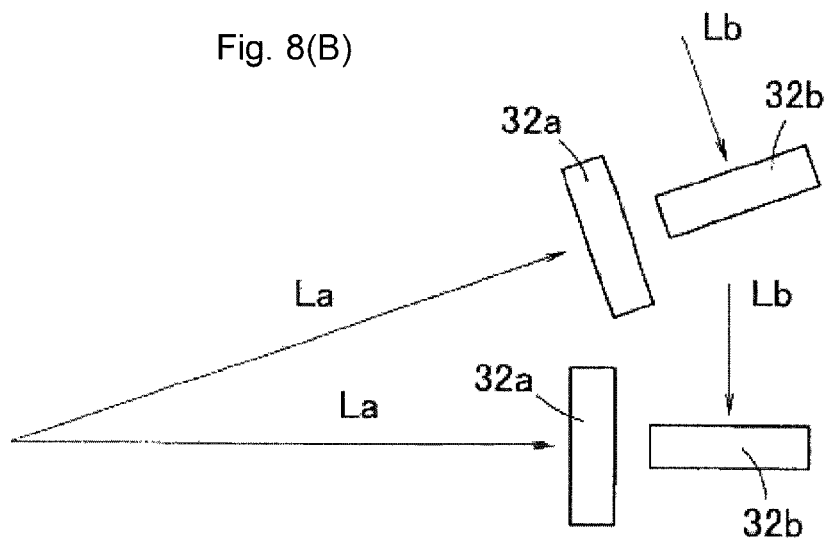
FIG. 8(B) is a view illustrating a basic arrangement of the deflection pattern in the surface illumination device of the first embodiment.

As illustrated in FIG. 8(B), when viewed from the direction (the Z-direction) perpendicular to the light-emitting surface 16c, one of the deflection patterns, namely, the first deflection pattern 32a is disposed such that the direction normal to the deflection reflecting surface 33 becomes parallel to the direction connecting the light source 17 and the deflection pattern 32a and such that the deflection reflecting surface 33 is oriented toward the side of the light source 17. When viewed from the direction (the Z-direction) perpendicular to the light-emitting surface 16c, the other deflection pattern, namely, the second deflection pattern 32b is disposed such that the direction normal to the deflection reflecting surface 33 is orthogonal to the direction connecting the light source 17 and the deflection pattern 32b.

Figure 9:
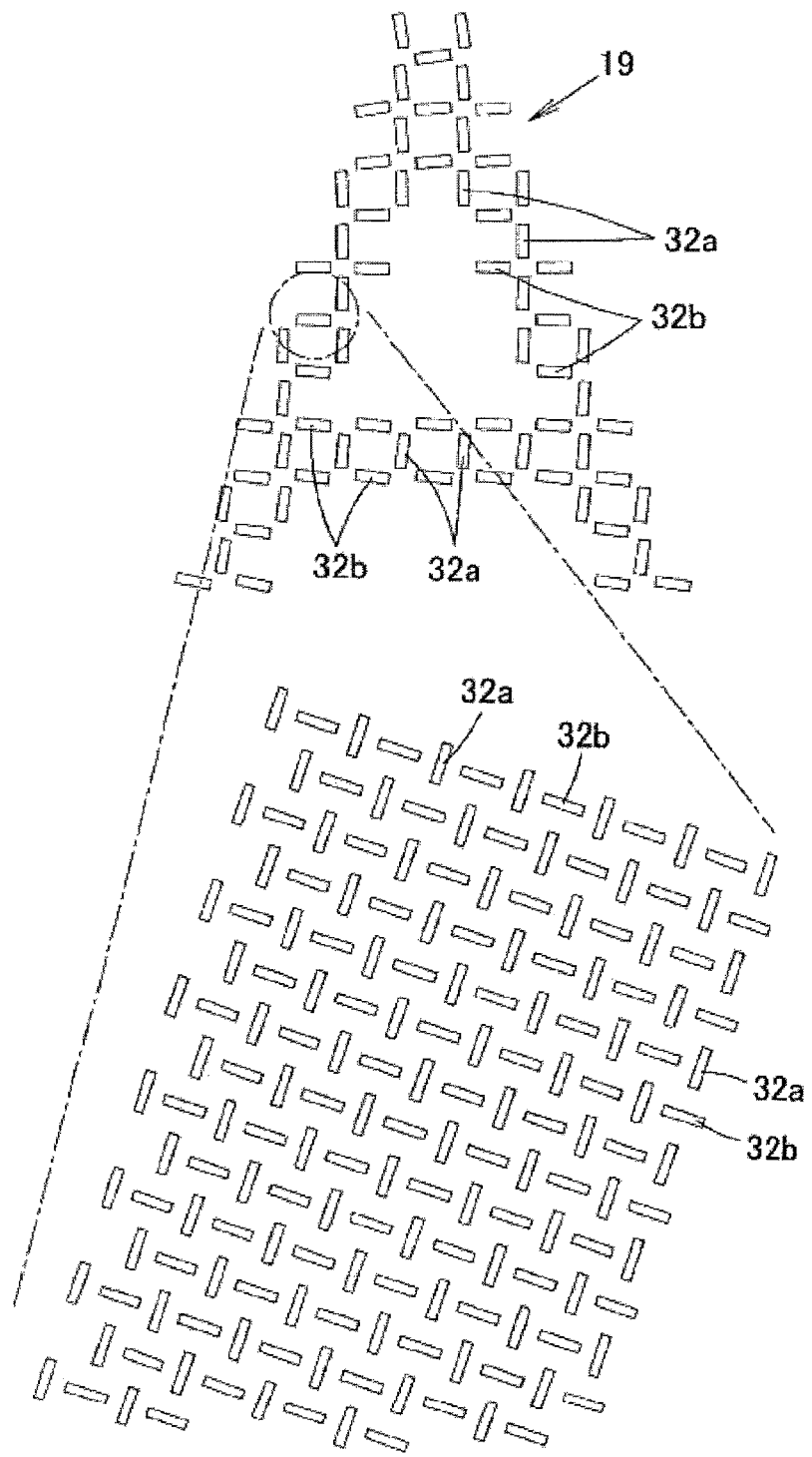
FIG. 9 is a view illustrating the arrangement of the deflection pattern in the display unit of the first embodiment.

FIG. 9 schematically illustrates the case that the display unit 19 having the shape of the character "A" is constructed by the deflection patterns 32a and 32b, and illustrates the partially-enlarged second deflection pattern 32b. The second deflection patterns 32b are arrayed into the arc shape about the point near the light source 17, and disposed such that the lengthwise direction of the display unit 19 is orthogonal to the arc direction. The first deflection pattern 32a and the second deflection pattern 32b are alternately arrayed in FIG. 9. Alternatively, the first deflection pattern 32a and the second deflection pattern 32b may randomly be arrayed.

The ray La in FIG. 8(A) indicates the light that directly reaches the display unit 19 in the light emitted from the light source 17 when viewed from the Z-direction. As illustrated in FIG. 8(B), because the direction in which the ray La travels is orthogonal to the first deflection pattern 32a, the ray La emits from the light-emitting surface 16c when the ray La is totally reflected by the deflection reflecting surface 33. The directional pattern of the emitting light La is the directional pattern Ca in FIG. 10. Because the second deflection pattern 32b is parallel to the ray La, the ray La is not reflected by the second deflection pattern 32b but the ray La goes straight until the ray La is totally reflected by the first deflection pattern 32a.

Figure 5A:
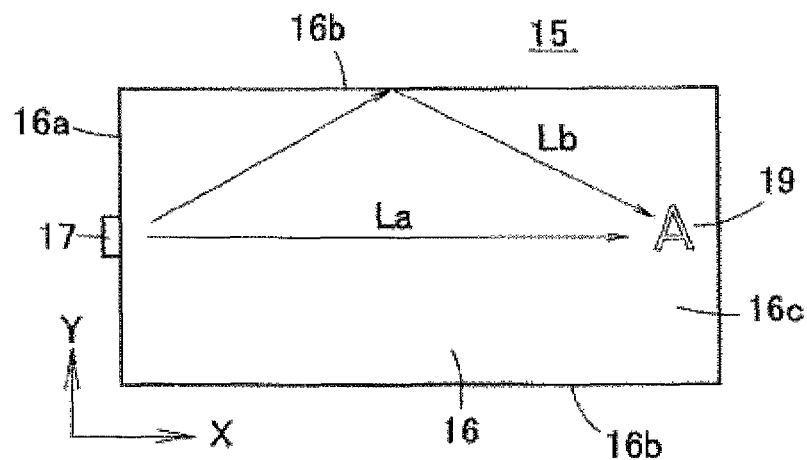
FIG. 5(A) is a view illustrating the light going straight from the light source side toward the display unit and the light, which is reflected from a side surface of a light guide plate to reach the display unit.
Figure 5B:
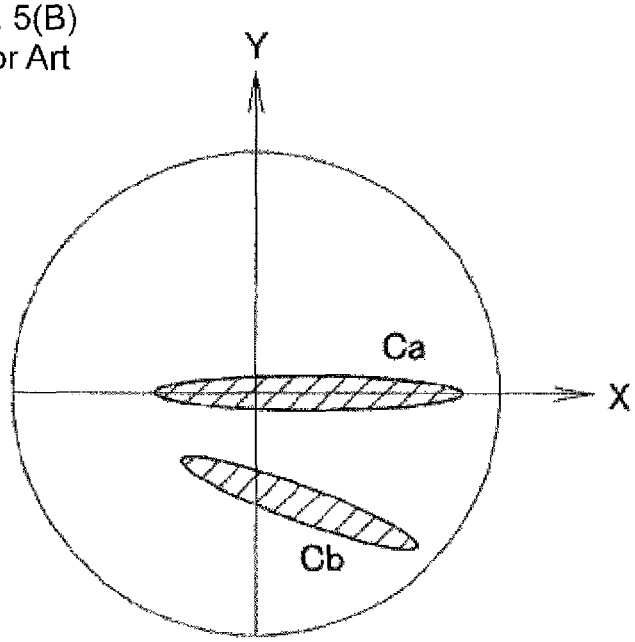
FIG. 5(B) is a view illustrating the directional pattern when the light going straight from the light source emits from the light-emitting surface and when the light, which is reflected from a side surface of a light guide plate to reach the display unit, emits from the light-emitting surface in the conventional surface illumination device.
Figure 6A:
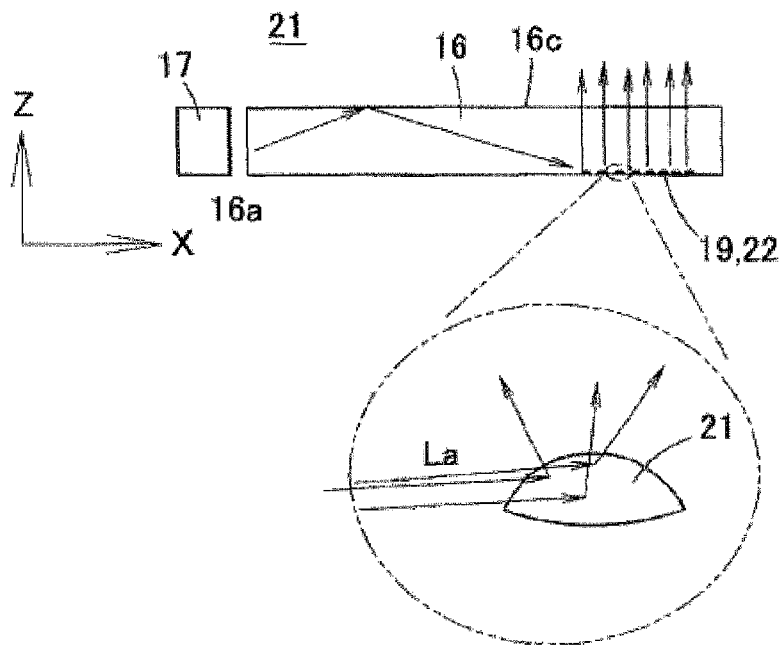
FIG. 6(A) is a schematic sectional view of another conventional surface illumination device together with one dome-shaped deflection pattern.
Figure 6B:
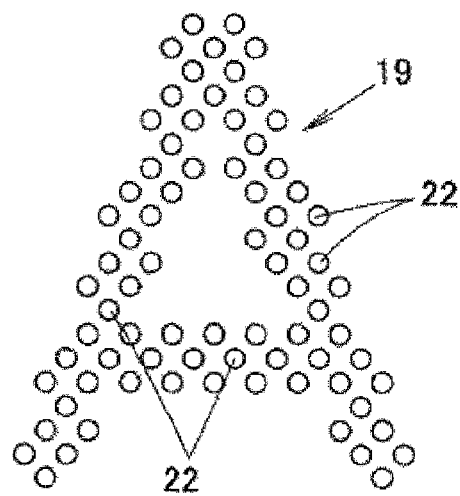
FIG. 6(B) is a plan view of the display unit provided in another conventional light guide plate.
Figure 7A:
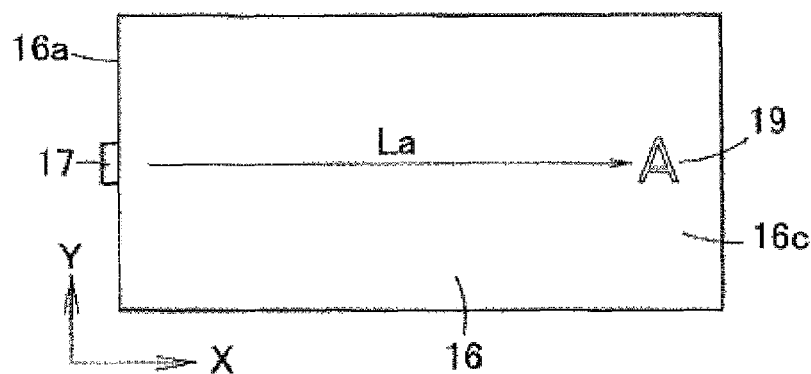
FIG. 7(A) is a view illustrating the light heading toward the conventional display unit in FIG. 6.
Figure 7B:
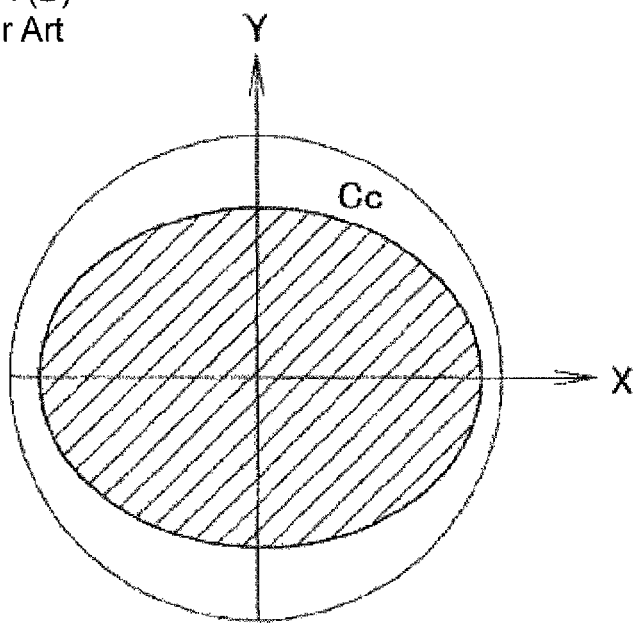
FIG. 7(B) is a view illustrating the directional pattern when the light in FIG. 7(A) emits from the light-emitting surface of the light guide plate.

In the light emitted from the light source 17, the ray Lb in FIG. 8(A) indicates the light that reaches the display unit 19 after being totally reflected by the side surface 16b of the light guide plate 16 when viewed from the Z-direction. Because the ray Lb is incident to the display unit 19 from the side surface side of the light guide plate 16, the ray Lb emits from the light-emitting surface 16c after being totally reflected by the second deflection pattern 32b as illustrated in FIG. 8(B). The directional pattern of the ray Lb totally reflected by the second deflection pattern 32b is a directional pattern Ct in FIG. 10. As described above with reference to FIG. 5, the light Lb emits from the light-emitting surface 16c after being also totally reflected by the first deflection pattern 32a, and becomes the light of the directional pattern Cb in FIG. 10. Therefore, in the surface illumination device of the first embodiment, the directional pattern of the light emitting from the light-emitting surface 16c becomes a hatched region in FIG. 10 as a whole.

Figure 10:
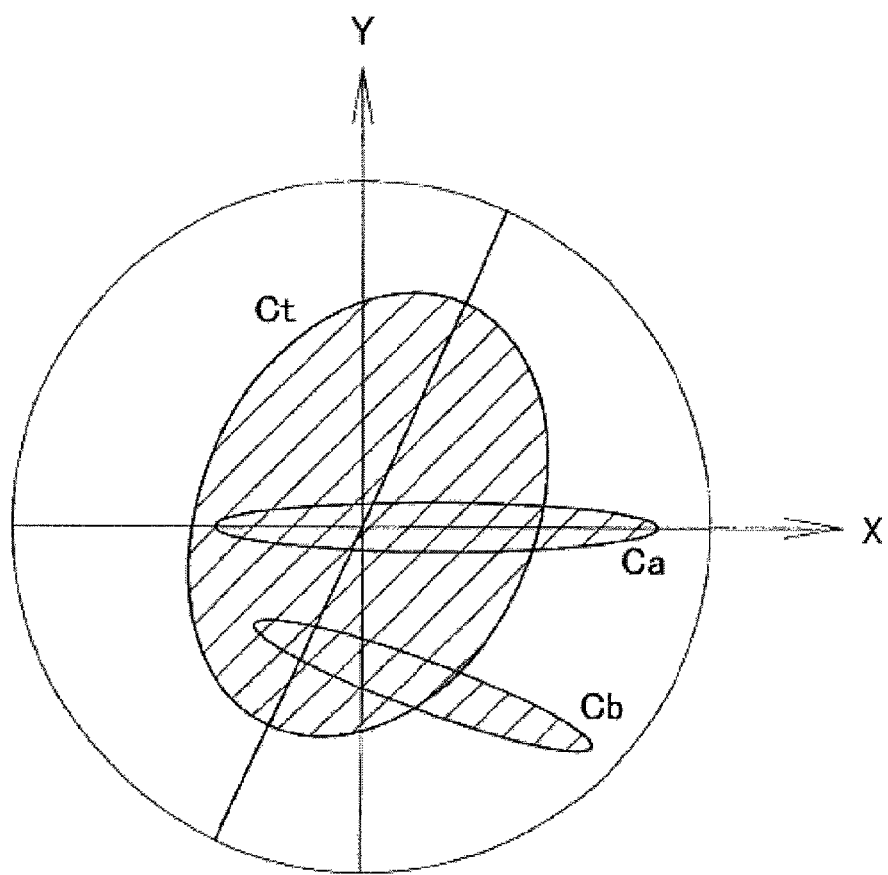
FIG. 10 is a view illustrating the directional pattern of the light emitting from the light-emitting surface in the surface illumination device of the first embodiment.

Because the display unit 19 of the surface illumination device 31 has the wide directional pattern as illustrated in FIG. 10, the icon 13 does not become rapidly dark even if the user vertically inclines the smartphone 11 while holding in the hand. Because the directional pattern is not divided into plural regions unlike the directional pattern in FIG. 5(B), the icon 13 hardly becomes bright and dark to flicker when the user vertically inclines the smartphone 11. Additionally, similarly to the conventional surface illumination device 15, the light La going straight from the light source 17 emits from the light-emitting surface 16c after being totally reflected by the first deflection pattern 32a. Therefore, there is no risk of degrading the front luminance unlike the case that the dome-shaped pattern 22 is used. The light Lb that spreads the directional pattern is the light that is not conventionally used to light the display unit 19, and the directional pattern of the display unit 19 is spread using the light Lb. Therefore, use efficiency of the light is also improved.

The side surface of the light guide plate 16 is not limited to the straight line in the drawing, but the side surface may be a curved surface. The curved side surface 16b formed into the arc shape can collect the light Lb in the wide range and transmit the light Lb to the display unit 19.

(Second Embodiment)

Figure 12A:
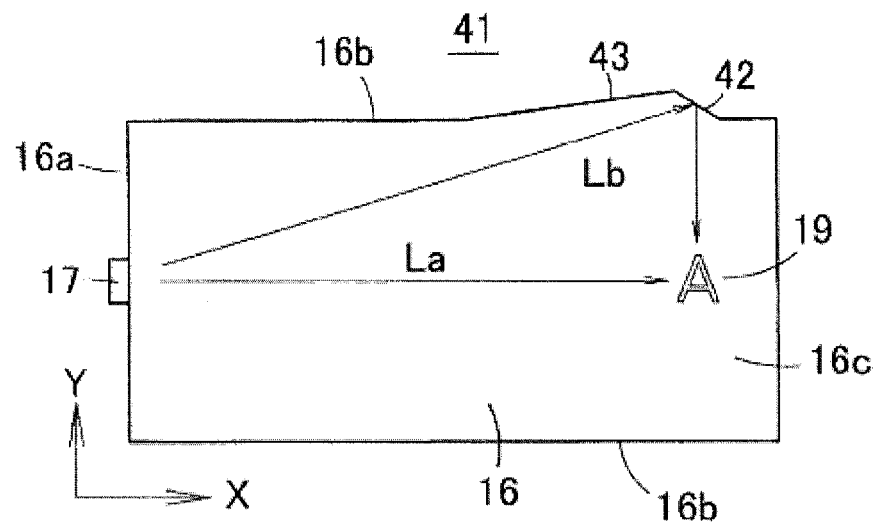
FIG. 12(A) is a schematic plan view of a surface illumination device according to a second embodiment of the present invention.
Figure 12B:
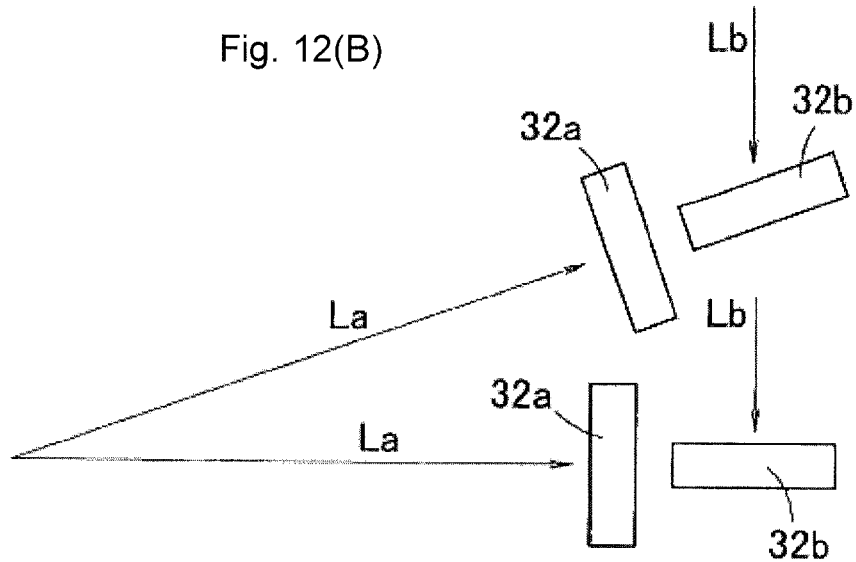
FIG. 12(B) is a view illustrating the light incident to first and second deflection patterns in the surface illumination device of the second embodiment.

FIG. 12 is a schematic plan view of a surface illumination device 41 according to a second embodiment of the present invention. In the surface illumination device 41, an inclined surface 42 is provided in the side surface of the light guide plate 16. The inclined surface 42 projects outward from the side surface 16b together with an adjacent slope 43. The inclined surface 42 is set to an angle at which the ray having the maximum intensity in the light Lb, which is emitted from the light source 17 and is incident to the inclined surface 42, can totally be reflected and transmitted in substantially parallel to the Y-direction to display unit 19. The slope 43 is substantially parallel to the maximum-intensity light incident to the inclined surface 42 so as not to interrupt the light Lb incident to the inclined surface 42.

Figure 13:
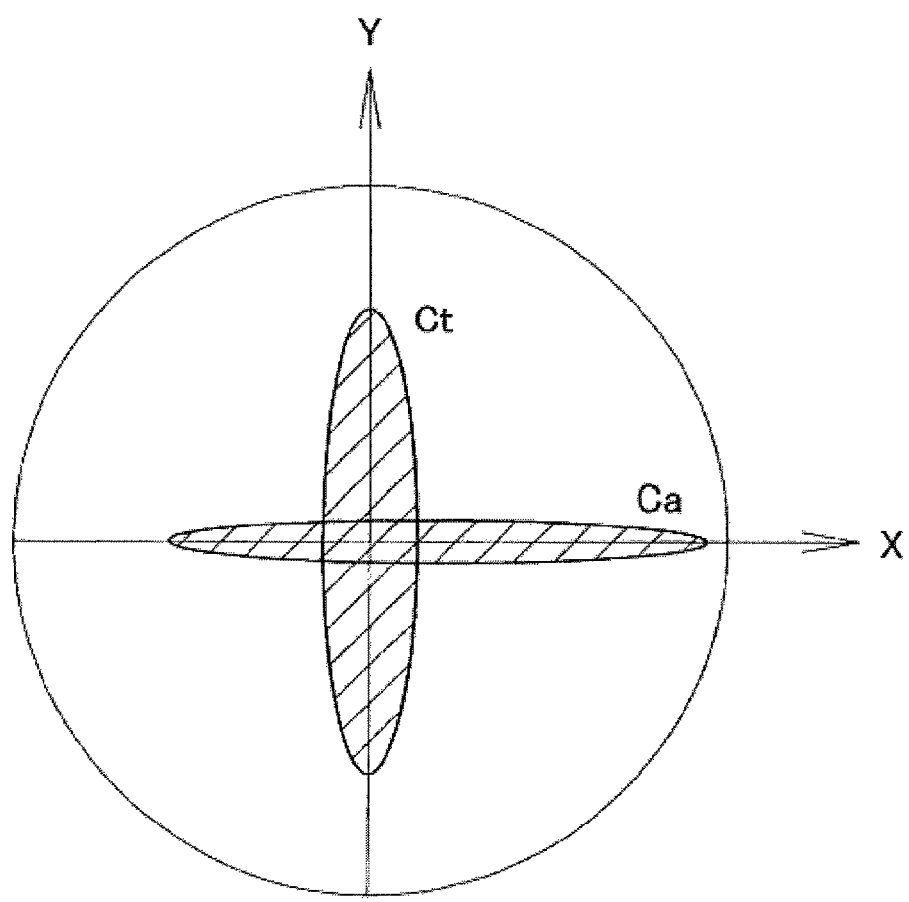
FIG. 13 is a view illustrating the directional pattern of the light emitting from the light-emitting surface in the surface illumination device of the second embodiment.

According to the second embodiment, the light Lb totally reflected by the inclined surface 42 is incident to the display unit 19 from the direction substantially parallel to the Y-direction. Therefore, the light Lb is hardly reflected by the first deflection pattern 32a, and the light of the directional pattern Cb goes out. As a result, the directional pattern Ca of the light La totally reflected by the first deflection pattern 32a and the directional pattern Ct of the light Lb totally reflected by the second deflection pattern 32b overlap each other in the directional pattern as illustrated in FIG. 13. In the second embodiment, not only the icon 13 hardly rapidly becomes dark or flickers when the user vertically inclines the smartphone 11, but also design of the directional pattern of the light emitting from the display unit 19 is facilitated.

In the surface illumination device 41 in FIG. 12(A), the inclined surface 42 and the slope 43 are provided only in one of the side surfaces. Alternatively, the inclined surface 42 and the slope 43 may similarly be provided in the side surface on the opposite side. The inclined surface 42 may be curved into the arc shape to have a light collecting function.

(Third Embodiment)

Figure 14A:
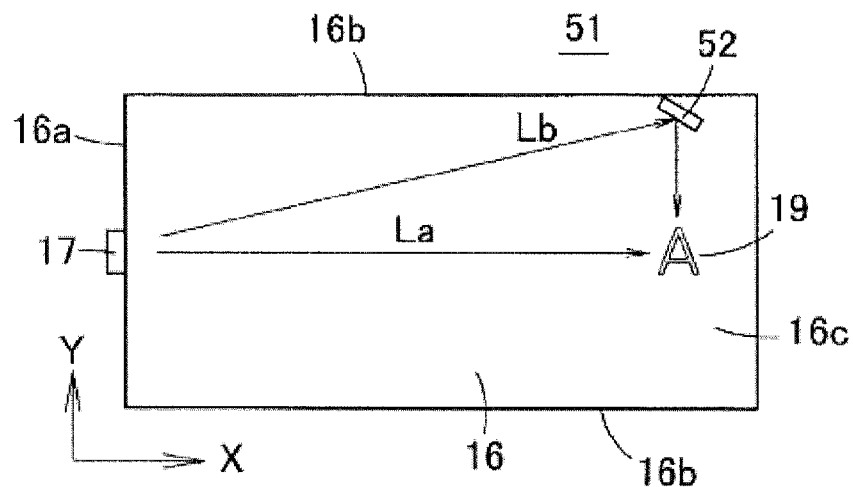
FIG. 14(A) is a schematic plan view of a surface illumination device according to a third embodiment of the present invention.
Figure 14B:
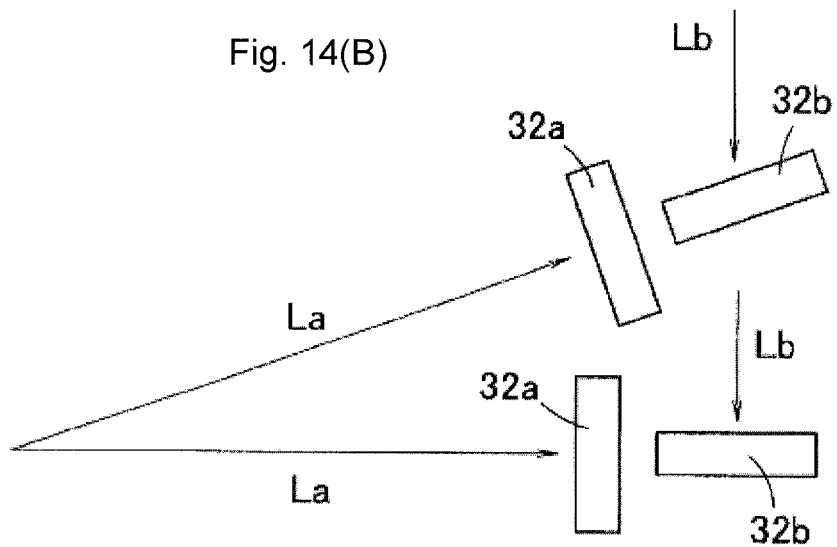
FIG. 14(B) is a view illustrating the light incident to the first and second deflection patterns in the surface illumination device of the third embodiment.

FIG. 14(A) is a schematic plan view of a surface illumination device 51 according to a third embodiment of the present invention. In the third embodiment, a reflection pattern 52 is provided in the light guide plate 16 in a lateral direction of the display unit 19. The reflection pattern 52 may be a recess having the triangular prism shape similar to the of the deflection pattern or a slit-like hole made in the light guide plate 16 (the hole may either pierce the light guide plate 16 or not pierce the light guide plate 16).

Figure 15:
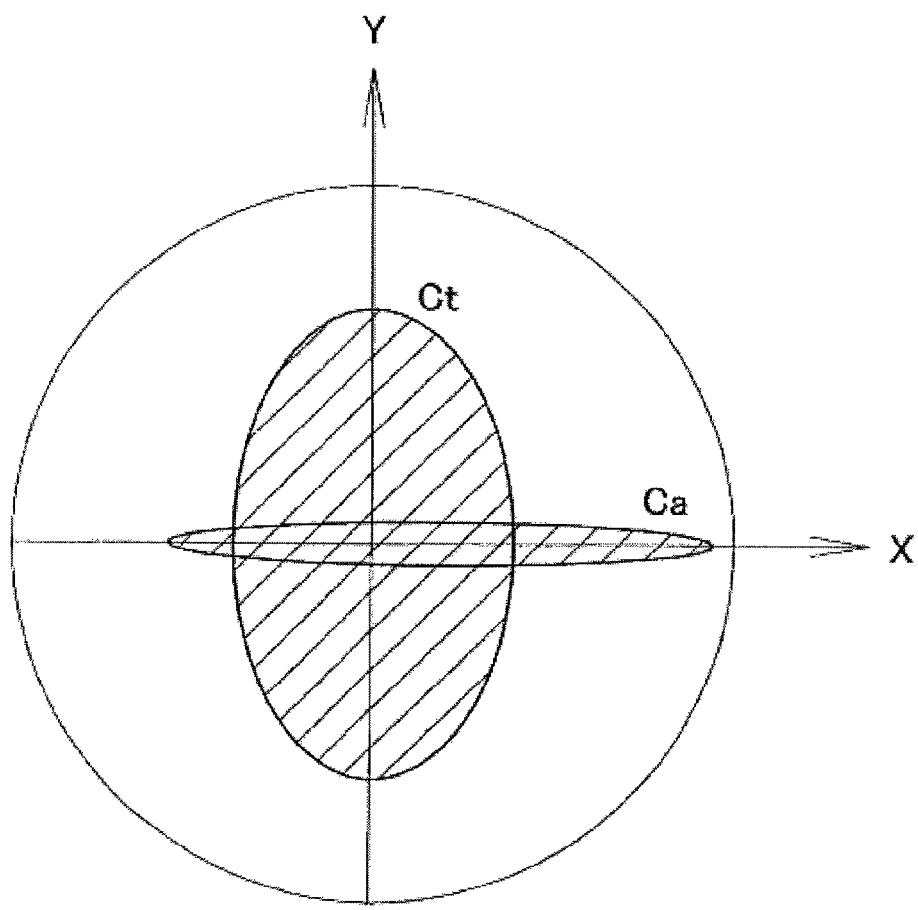
FIG. 15 is a view illustrating the directional pattern of the light emitting from the light-emitting surface in the surface illumination device of the third embodiment.

In the third embodiment, similarly to the second embodiment, the light Lb traveling toward the side surface side of the light guide plate 16 can totally be reflected by the reflection pattern 52 and transmitted in parallel to the Y-direction to the display unit 19. Therefore, the directional pattern similar to that of the second embodiment can be obtained as illustrated in FIG. 15.

(Fourth Embodiment)

Figure 16:
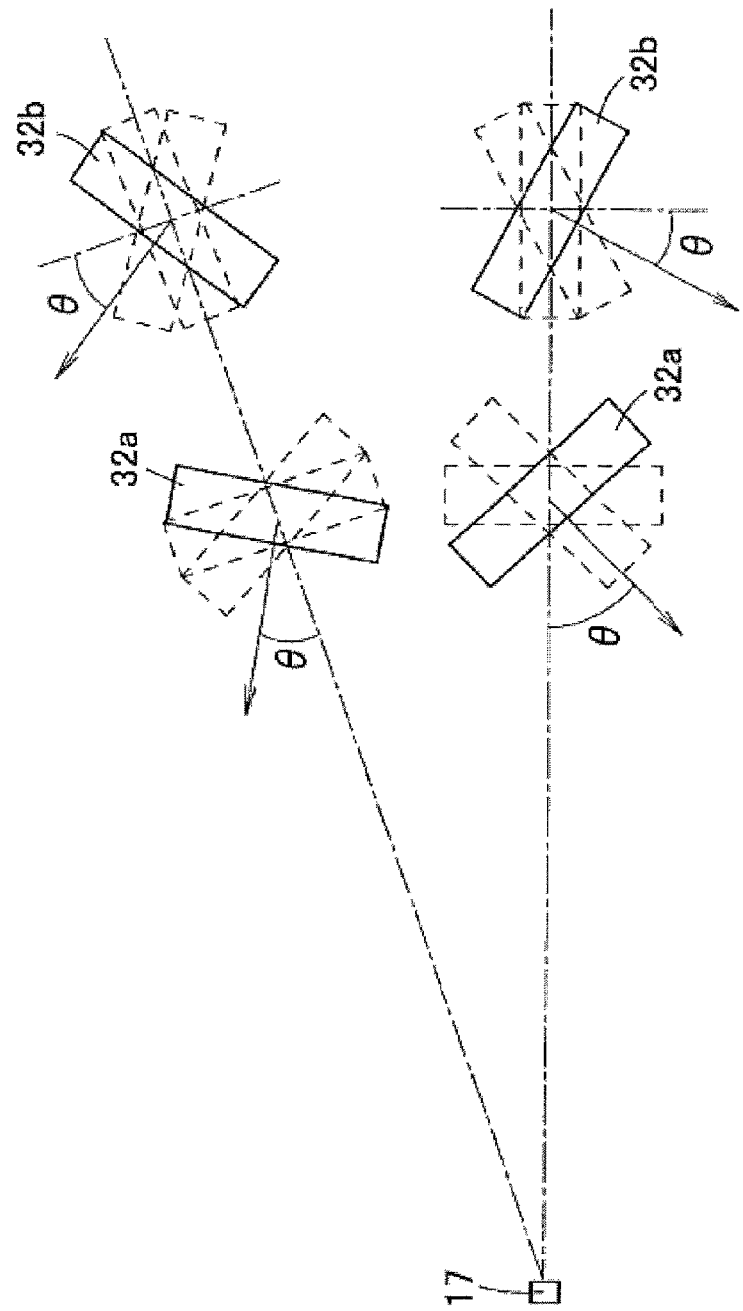
FIG. 16 is a view illustrating the arrangement of the deflection pattern in a surface illumination device according to a fourth embodiment of the present invention.

FIG. 16 is a view illustrating a surface illumination device according to a fourth embodiment of the present invention. In the fourth embodiment, each of the first deflection pattern 32a and the second deflection pattern 32b may rotate about a center thereof. That is, the direction of a line N normal to the deflection reflecting surface 33 of the first deflection pattern 32a may not be parallel to the direction connecting the first deflection pattern 32a and the light source 17. The direction of the line N normal to the deflection reflecting surface 33 of the second deflection pattern 32b may not be orthogonal to the direction connecting the second deflection pattern 32b and the light source 17.

However, although the second deflection pattern 32b may rotate in any direction, desirably an inclination angle θ of the second deflection pattern 32b is less than or equal to 25°. As used herein, the inclination angle θ means an angle that is formed by the direction of the line N normal to the deflection reflecting surface 33 of the deflection pattern 32b and the direction orthogonal to the direction connecting the second deflection pattern 32b and the light source 17 when the second deflection pattern 32b is viewed from the direction perpendicular to the light-emitting surface 16c.

Figure 17:
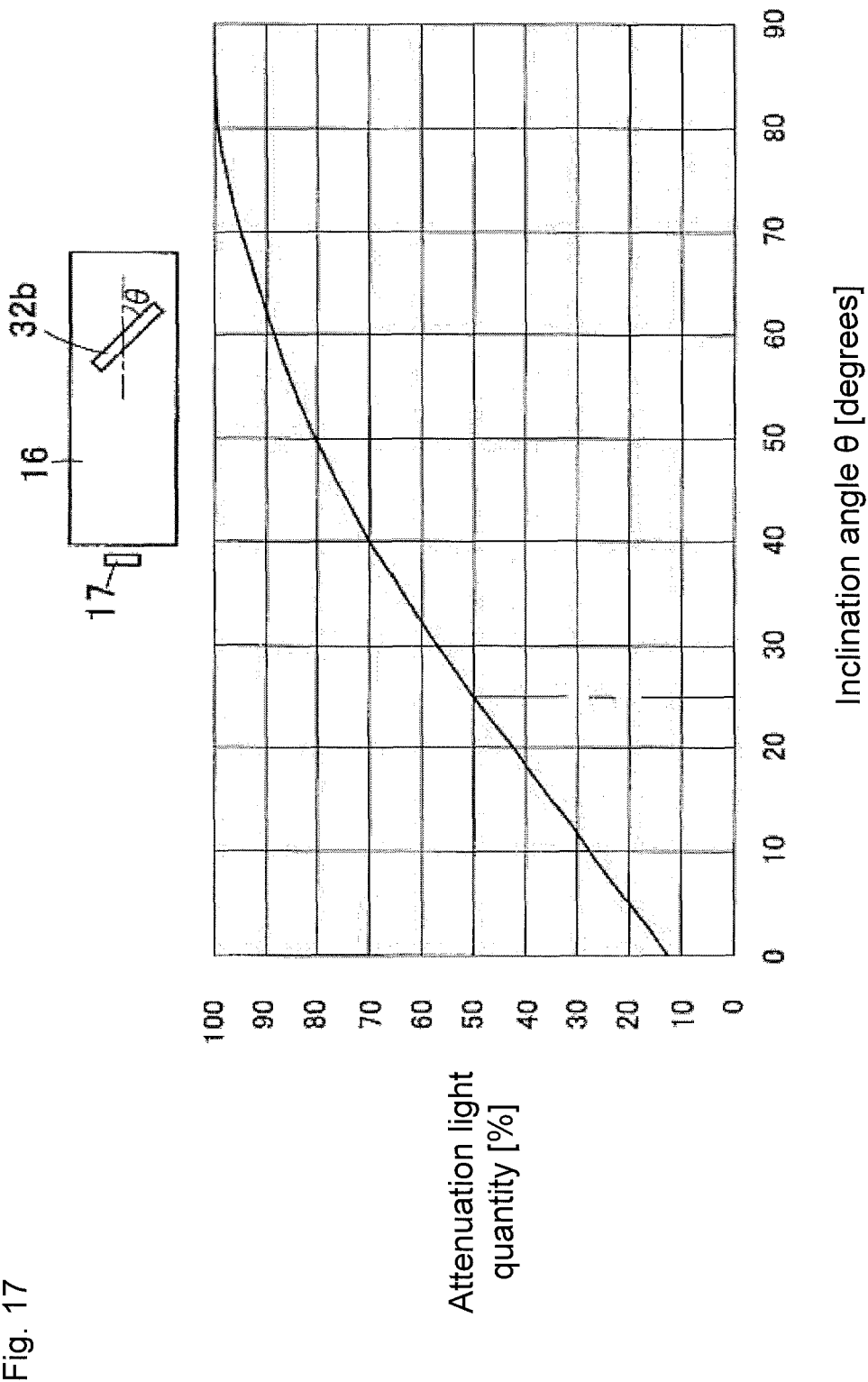
FIG. 17 is a view illustrating a relationship between an inclination angle of the deflection pattern and an attenuation light quantity.

FIG. 17 illustrates the reason the inclination angle θ of the second deflection pattern 32b is desirably less than or equal to 25°. FIG. 17 illustrates a measurement result of a relationship between the inclination angle θ of the second deflection pattern 32b and an attenuation light quantity before and after the light passes through the second deflection pattern 32b. The attenuation light quantity is a quantity indicating how many percentage of the light is guided behind the second deflection pattern 32b without changing the traveling direction when the light is incident to the second deflection pattern 32b from the light source side. When the attenuation light quantity excessively increases, the light hardly reaches the first deflection pattern 32a on the side far away from the light source, and the luminance of the display unit 19 becomes inhomogeneous. Desirably the attenuation light quantity is less than or equal to 50%. Therefore, referring to FIG. 17, desirably the inclination angle θ is less than or equal to 25°.

On the other hand, for the first deflection pattern 32a, the angle that is formed by the direction of the line N normal to the deflection reflecting surface 33 and the direction connecting the first deflection pattern 32a and the light source 17 is less than or equal to 30° when the first deflection pattern 32a is viewed from the direction (the Z-direction) perpendicular to the light-emitting surface 16c.

The deflection patterns 32a and 32b are not limited to the recessed pattern, but the deflection patterns 32a and 32b may be a projection pattern that projects from the lower surface of the light guide plate 16. The first and second deflection patterns 32a and 32b may be provided in the light-emitting surface 16c of the light guide plate 16. When the first and second deflection patterns 32a and 32b are provided in the light-emitting surface 16c, the light transmitted through the deflection patterns 32a and 32b emits from the light-emitting surface 16c.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 11 smartphone
13 icon
16 light guide plate
16a light incident end face
16b side surface
16c light-emitting surface
17 light source
19 display unit
31, 41, 51 surface illumination device
32a first deflection pattern
32b second deflection pattern
33 deflection reflecting surface
42 inclined surface
43 slope
52 reflection pattern

The invention claimed is:

1. A surface illumination device comprising:
a light source; and
a light guide plate having a light-emitting surface,
wherein the light guide plate guides light from the light source such that the light is emitted from a display region of the light-emitting surface,
wherein a plurality of first deflection patterns having deflection inclined surfaces and a plurality of second deflection patterns having deflection inclined surfaces are formed in the display region in at least one of the light-emitting surface of the light guide plate and an opposite surface to the light-emitting surface,
wherein, when viewed from a direction perpendicular to the light-emitting surface of the light guide plate, the first deflection pattern is disposed such that an angle formed by a line normal to the deflection inclined surface and a direction connecting the light source and the first deflection pattern is less than or equal to 30°,
wherein, when viewed from a direction perpendicular to the light-emitting surface of the light guide plate, the second deflection pattern is disposed such that an angle formed by a line normal to the deflection inclined surface and a direction connecting the light source and the second deflection pattern is less than or equal to 25°, and
wherein, when viewed from a direction perpendicular to the light-emitting surface of the light guide plate, part of the light emitted from the light source is reflected on a side surface side of the light guide plate to reach the second deflection pattern.

2. The surface illumination device according to claim 1, wherein part of the light emitted from the light source is totally reflected by a side surface side of the light guide plate to reach the second deflection pattern.

3. The surface illumination device according to claim 1, wherein an inclined surface is provided in the side surface of the light guide plate in order to totally reflect part of the light emitted from the light source toward the second deflection pattern.

4. The surface illumination device according to claim 1, wherein a reflection pattern is provided near the side surface of the light guide plate in order to totally reflect part of the light emitted from the light source toward the second deflection pattern.

5. A mobile phone that has transmission and reception functions, comprising:
the surface illumination device according to claim 1,
wherein the surface illumination optically displays a certain shape.

6. An information terminal that has an information processing function, comprising:
the surface illumination device according to claim 1,
wherein the surface illumination device optically displays a certain shape.

* * * * *